United States Patent
Jackson et al.

(10) Patent No.: US 10,649,243 B2
(45) Date of Patent: May 12, 2020

(54) EXPANDED COLOR GAMUT FOR THERMOCHROMIC COLOR PROCESSING

(71) Applicant: Palo Alto Research Center Incorporated, Palo Alto, CA (US)

(72) Inventors: Warren B. Jackson, San Francisco, CA (US); Christopher L. Chua, San Jose, CA (US); Ashish Pattekar, Cupertino, CA (US)

(73) Assignee: Palo Alto Research Center Incorporated, Palo Alto, CA (US)

(*) Notice: Subject to any disclaimer, the term of this patent is extended or adjusted under 35 U.S.C. 154(b) by 133 days.

(21) Appl. No.: 16/049,017

(22) Filed: Jul. 30, 2018

(65) Prior Publication Data
US 2020/0033643 A1 Jan. 30, 2020

(51) Int. Cl.
*G02F 1/01* (2006.01)

(52) U.S. Cl.
CPC ........ *G02F 1/0147* (2013.01); *G02F 2201/34* (2013.01); *G02F 2203/03* (2013.01)

(58) Field of Classification Search
CPC . G02F 1/0147; G02F 2201/34; G02F 2203/03
USPC ................ 359/237, 238, 240, 288
See application file for complete search history.

(56) References Cited

U.S. PATENT DOCUMENTS

| | | | |
|---|---|---|---|
| 7,521,159 B2 * | 4/2009 | Iftime | G02F 1/0126 430/19 |
| 7,884,992 B1 * | 2/2011 | Wang | G02B 5/23 349/13 |
| 2005/0279235 A1 * | 12/2005 | Barthram | B41M 3/144 101/483 |
| 2006/0222973 A1 | 10/2006 | Iftime et al. | |
| 2007/0060013 A1 | 3/2007 | Schmidt et al. | |
| 2017/0021638 A1 | 1/2017 | Barndt et al. | |
| 2017/0341448 A1 | 11/2017 | Jarvis et al. | |

* cited by examiner

Primary Examiner — Tuyen Tra
(74) Attorney, Agent, or Firm — Mueting, Raasch & Gebhardt

(57) ABSTRACT

An article includes a substrate with at least first and second materials disposed in or over the substrate. The first material is a non-color changeable material of at least one first color and the second material is a thermochromic color changeable material activated to produce at least one second color different from the first color. Additive color mixing of the first and second colors produces at least one third color different from the first and second colors.

22 Claims, 13 Drawing Sheets

EXPANDED COLOR GAMUT FOR THERMOCHROMIC COLOR PROCESSING

TECHNICAL FIELD

This disclosure relates generally to articles that include thermochromic materials and to related methods and systems.

BACKGROUND

Thermochromic materials change color in response to exposure to temperature or light. Thermochromic inks can be applied to relatively larger areas on a substrate by a number of printing or coating processes such as lithography, flexography, gravure, screen printing, spreading with film applicators such as bird bars. After coating or printing the larger areas, a laser may be precisely controlled to direct radiation toward the deposited thermochromic material to produce a color change in precisely controlled regions.

BRIEF SUMMARY

Some embodiments are directed to an article that includes a substrate with at least first and second materials disposed in or over the substrate. The first material is a non-color changeable material of at least one first color and the second material is a thermochromic color changeable material activated to produce at least one second color different from the first color. Additive color mixing of the first and second colors produces at least one third color different from the first and second colors.

Some embodiments involve a method of making a colored article. The method includes disposing a color changeable thermochromic material in or over a substrate. A non-color changeable material of at least one first color is disposed in or over the substrate. The thermochromic material is activated to produce at least one second color different from the first color such that at least one third color different from the first and second colors is produced by additive color mixing of the first and second colors.

BRIEF DESCRIPTION OF DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION OF ILLUSTRATIVE EMBODIMENTS

Figure 1:
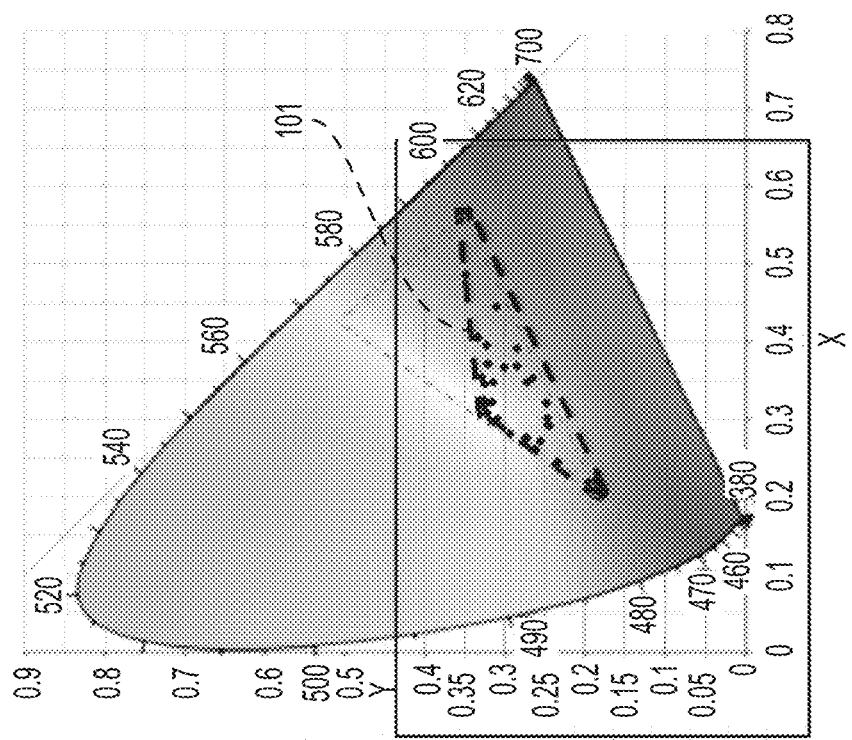
FIG. 1 provides a CIE color space model showing the range of possible colors perceivable by the human eye.

Embodiments herein relate to expanding the color gamut of thermochromic materials useful in inks that can be printed onto two dimensional (2D) or three dimensional (3D) objects such as labels, cartons, containers, and other 2D or 3D objects. Thermochromic inks change color after exposure to temperature or laser light which enables technology for printing color at high speeds and to print long throw color on 3D objects. In some cases, constituents in the thermochromic ink absorb laser energy and convert the light energy to heat that then activates a chemical reaction to produce the color change. In other cases, the color change can be activated using in-contact heater elements or directed hot air. In yet other cases, the color change can be activated by direct photo-induced chemical change, instead of heat produced via an intermediary light absorber. However, the color gamut of thermochromic materials is currently fairly limited. Some thermochromic materials are capable of being activated to produce two colors, red and blue. FIG. 1 provides a CIE color space model showing the range of possible colors perceivable by the human eye. Area 101 represents the color gamut that can be obtained using currently known two color thermochromic materials.

Approaches disclosed herein are directed to enhance the gamut of the optical properties of currently available thermochromic materials. Embodiments disclosed involve using a non-color changeable material of at least a one first color in conjunction with a color changeable thermochromic material activated to produce at least one second color different from the first color. The non-color changeable and color changeable materials are arranged such that additive color mixing of the first and second colors produces at least one third color that is different from the first and second colors.

FIGS. 2 through 7 are schematic representations of articles according to various embodiments in which additive color mixing of at least one first color of a non-color changeable material and at least one second color of an activated color changeable thermochromic material produce at least one third color different from the first and second colors. Additive color mixing can arise in at least two scenarios which are both applicable to this disclosure. In a first scenario, first and second color are disposed side by side in patches. The patches are sufficiently small so that the eye cannot resolve the patches and the first and second colors additively mix. This type of color mixing is referred to as half-toning. In a second scenario, an overlayer of a first color is sufficiently transparent such that a second color of the under layer is in partly visible through the over layer.

Figure 2:
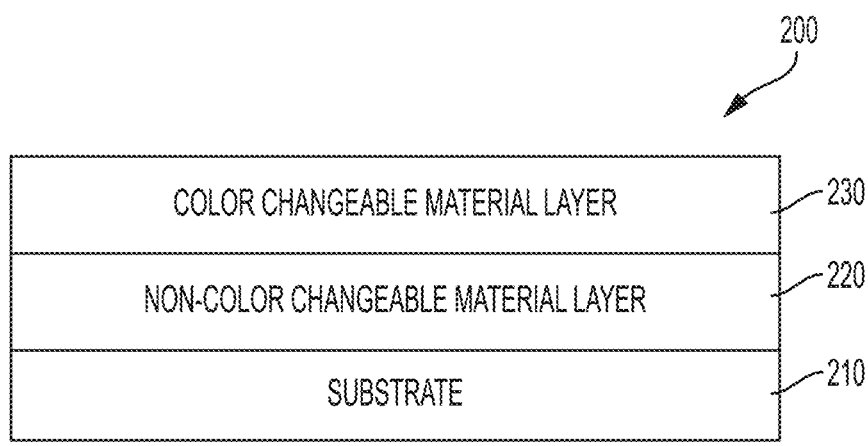
FIGS. 2 through 6 are schematic representations of articles according to various embodiments in which additive color mixing of at least one first color of a non-color changeable material and at least one second color of an activated color changeable thermochromic material produce at least one third color different from the first and second colors.

FIG. 2 illustrates an article 200 in accordance with some embodiments. Article 200 comprises a substrate 210 having a layer 220 of a non-color changeable material disposed thereon. The substrate 210 may be made of any suitable material such as paper, cardboard, metal, wood, plastic, woven or nonwoven materials. The substrate may be opaque or transparent or partially transparent to visible light. The non-color changeable material has at least one first color. Layer 220 may be substantially continuous as shown or may be patterned onto the substrate 210 into discrete regions of the first color(s). Layer 220 may be disposed directly on the substrate 210 as shown or one or more intervening layers may be disposed between layer 220 and the substrate 210.

A layer 230 of color changeable thermochromic material is disposed on or over layer 220. In various embodiments, layer 230 may be substantially continuous or may be deposited in discrete regions. Layer 230 may be deposited directly onto layer 220 as shown in FIG. 2, or there may be one or more intervening layers between layers 220 and 230.

Prior to activation, the color changeable material of layer 230 can be substantially transparent to visible light or may have an initial color. After activation by exposure to radiation, the color changeable thermochromic layer 230 changes to at least one second color different from the first color of the non-color changeable material. Optical properties, including color and transparency, of the activated thermochromic material depend on the wavelength, intensity, and/or duration of the activation radiation.

The article 200 may be designed to be viewed by a human from the top or from the bottom, wherein the terms "top" and "bottom" refer to the orientation of the article 200 as shown in FIG. 2. The terms "top" and "bottom" are relative and are used here for explanation only. These terms are not intended to suggest any particular orientation of article 200 as the article 200 maybe oriented in any position.

In some embodiments in which article 200 is designed to be viewed from the bottom, e.g., through the substrate 210, the substrate 210 may be made of a transparent or semitransparent material. Deposition of layer 220 may be controlled such that the non-color changeable material of layer 220 is also partially transparent to visible light. The partial transparency of layer 220 allows the second color of layer 230 to be partially visible allowing for additive mixing of stacked layers of the first color of layer 220 and the second color of layer 230 to produce the third color when viewed by an observer through the substrate 210.

In some embodiments in which the article 200 is designed to be viewed from the top, the transparency of layer 230 after activation may be controlled such that the first layer 220 is partially visible through the second layer 230, allowing for additive color mixing of the stacked layers 220, 230 to produce the third color different from the first and second colors. In this implementation, the substrate 210 may be opaque.

In some implementations, as described in more detail below, the layer of non-color changeable material and the layer of activated color changeable material are patterned. Where the layers of non-color changeable material and activated color changeable material are patterned, halftoning, involving side-by-side regions of the first and second colors, provides for additive color mixing that can produce one or more halftone third colors as described below.

In some embodiments, the color change of the color changeable material is permanent or durable in that the color changeable material does not revert or at least does not completely or substantially revert to its unactivated state when removed from the activation radiation. However, it is also possible that the color change of the color changeable material is transient such that the color changeable material presents the second color only when the color changeable material is exposed to the activation radiation or for a relatively short time period after the exposure.

The layer 220 of non-color changeable material and/or the layer 230 of color changeable material may be deposited by any suitable process. For example, printing processes such as lithography, flexography, gravure, jet printing, etc. may be used to deposit the layers 220, 230. Although the unactivated color changeable material may be deposited in larger areas with relatively less precision, activation of selected regions of the second layer 230 can be precisely controlled by directing the radiation beam only to the selected regions of the color changeable material.

Figure 3:
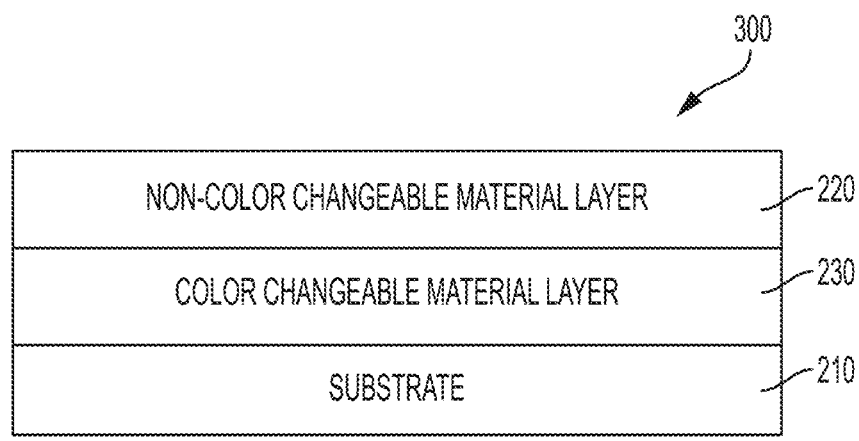

Alternatively, as illustrated in FIG. 3, in some embodiments, the article 300 comprises the color changeable material layer 230 disposed between the substrate 210 and the non-color changeable material layer 220. In these embodiments, the color changeable material of layer 230 is activated by a laser beam that passes through layer 220 or through the substrate 210 to produce the second color. Thus, either layer 220 or the substrate 210 is at least partially transparent at the wavelength of the activation radiation.

Figure 4:
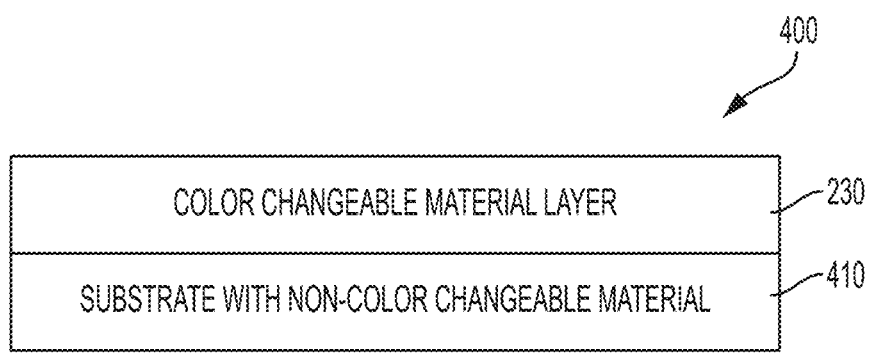

In some implementations, the non-changeable material or the color changeable material or both may be a pigment or dye incorporated within the substrate. FIG. 4 illustrates an article 400 comprising a substrate 410 having a non-color changeable material embedded within the substrate 410. A layer 230 of color changeable thermochromic material is disposed over the substrate 410. Layer 230 may be disposed directly on the substrate 410 as shown, or there may be any number of intervening layers between substrate 410 and layer 230.

When the article 400 is configured to be observed from the top with additive color mixing occurring through stacked layers, layer 230 may be semitransparent to allow for additive color mixing of the first color of the non-color changeable material in the substrate 410 and the second color of the color changeable material of layer 230 to produce the third color. When the article 400 is configured to be observed from the bottom, the substrate 410 may be semitransparent to allow for additive color mixing of the first color of the non-color changeable material in the substrate 410 and the second color of the color changeable material of layer 230 to produce the third color.

In further embodiments, as discussed below, non-color changeable material in the substrate 410 and/or the color changeable material of layer 230 may be patterned. The patterned layer or layers can allow for additive color mixing to produce the third color through halftoning.

Figure 5:
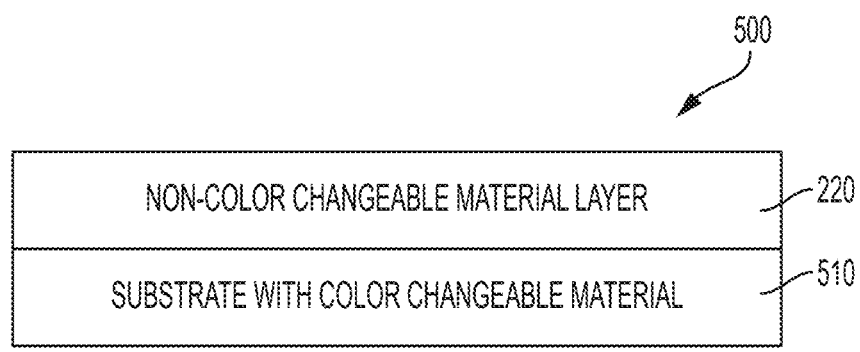

In an embodiment, as illustrated in FIG. 5, article 500 comprises a substrate 510 having a color changeable material incorporated within the substrate 510 with a non-color changeable material layer 220 disposed on the substrate 510. Layer 220 may be disposed directly on the substrate 510 as shown, or there may be any number of intervening layers between substrate 510 and layer 220.

When the article 500 is configured to be observed from the top with additive color mixing occurring through stacked layers, layer 220 may be semitransparent to allow for additive color mixing of the second color of the color changeable material in the substrate 510 and the first color of the non-color changeable material of layer 220 to produce the third color. When the article 500 is configured to be observed from the bottom, the substrate 510 may be semitransparent to allow for additive color mixing of the second color of the color changeable material in the substrate 510 and the first color of the non-color changeable material of layer 220 to produce the third color.

Halftoning is a process by which an image is comprised of discrete dots of one or more colors rather than continuous colors. When viewed from a distance, the dots blur together, creating the illusion of a continuous image. The color of the halftoned image is a mixture of the colors of the dots that comprise the image.

In some implementations, a non-color changeable material of at least one first color and/or color changeable thermochromic material of at least one second color may be formed in a pattern in or over the substrate. In some embodiments, these patterns involve dots, lines, or other regions that can vary in area. The patterns of the dots (or other regions) can produce halftone colors. For example, in some implementations the amount of the first color (or the amount of the second color) in a halftone third color can be varied by varying the size of the dots of the first (or second) color.

Figure 6:
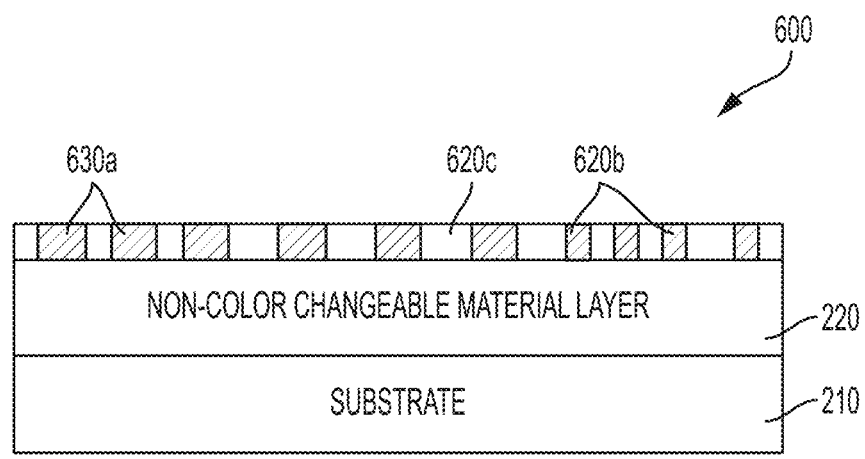

FIG. 6 illustrates an article 600 in which a layer 220 of non-color changeable material having a first color is disposed on a substrate 210. A layer of color changeable material is disposed on layer 220. A pattern of second color regions 630a,b is formed by activating the color changeable material in regions 630a,b and not activating the color changeable material in regions 630c. The regions 630a,b may have a relatively larger size (regions 630a) or may have a relatively smaller size (regions 630b), wherein the "size" of the regions may denote the surface area and/or thickness of the regions. The size and/or spacing of the regions 630a, 630b can determine the amount of the second color that mixes with the first color of the non-color changeable material to produce the halftone third color. For example, larger or more closely spaced regions 630a,b would produce a halftone third color that has relatively more of the second color present than a halftone third color that is produce wherein the regions 630a,b are smaller or more distantly spaced. In alternative embodiments, the patterned color changeable material may be disposed between the non-color changeable material and the substrate and/or the non-color changeable material may be patterned and the color changeable material may be patterned or non-patterned.

Figure 7:
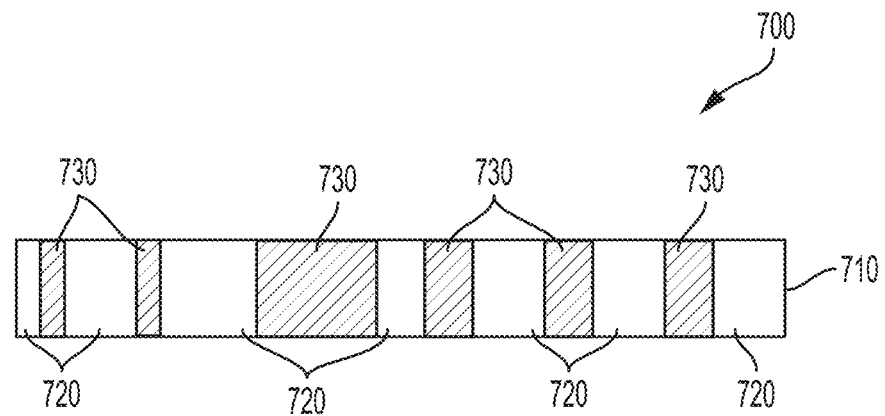
FIG. 7 illustrates an article in which a the non-color changeable material and the color changeable material are both embedded within a substrate in accordance with some embodiments.

FIG. 7 illustrates an article 700 in which a non-color changeable material and a color changeable material are both embedded within the substrate 710. The color changeable material is activated, producing regions 720 of non-color changeable material having at least one first color interspersed with regions 730 of activated color changeable material of a second color. The first color of regions 720 and the second color of regions 730 additively mix to produce a halftone third color that is different from the first and second colors.

Figure 8A:
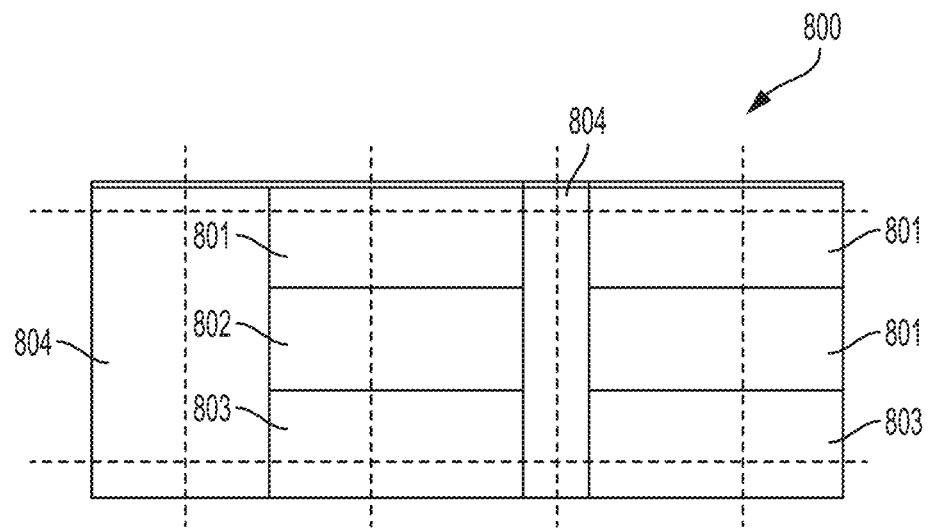
FIGS. 8A through 10B illustrate labels that can be made using the approaches outlined herein to enhance the color gamut of articles printed using a color changeable ink.

In some implementations, the color changeable material and/or the non-color changeable material may be patterned in or on the substrate in a way that produces different color regions. According to some aspects, the color regions may provide for a multicolor article. According to some aspects, some of the multiple colors may be halftone colors resulting from mixing of the first color of the non-color changeable material and the second color of the color changeable material. FIGS. 8A through 10B illustrate labels that can be made using the approaches outlined above to enhance the color gamut of articles printed using a color changeable ink. FIG. 8A illustrates a label 800 after a non-color changeable material of a first color, e.g., a yellow ink, is printed in a pattern on the label 800. The pattern may include areas having more dots (or other shapes) or larger dots and areas having fewer or smaller dots. For example, areas 801 may have fewer or smaller dots of the non-color changeable material than area 802 which has fewer or smaller dots of the non-color changeable material than areas 803. Areas 801 of the label 800 may have none of the non-color changeable material disposed thereon, for example.

Figure 8B:
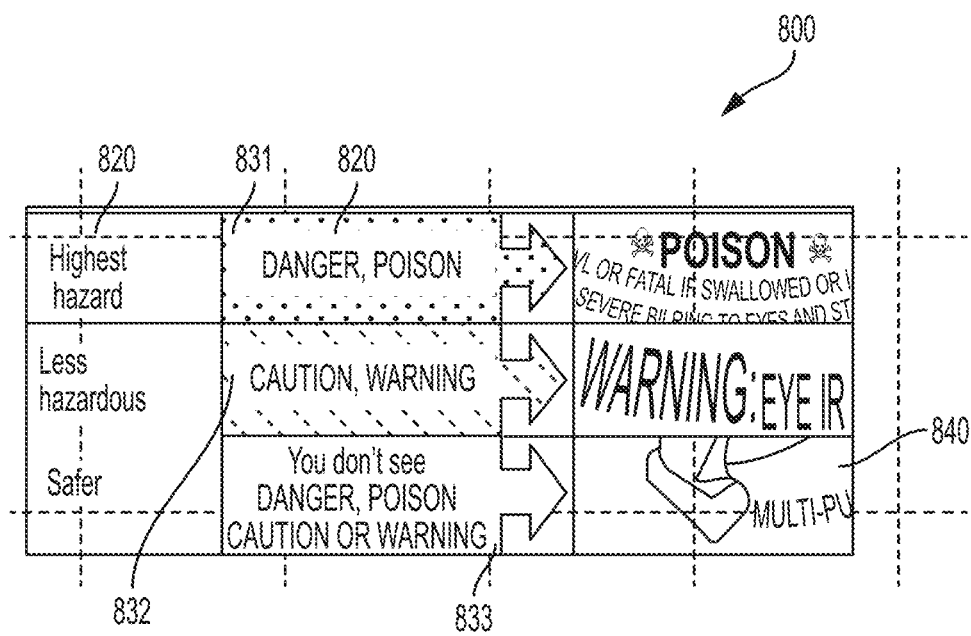

Before or after the non-color changeable material is applied in the pattern indicated in FIG. 8A, a non-activated color changeable thermochromic material can be disposed in a pattern, e.g., by printing, over the entire label 800 or in selected locations of the label 800. The color changeable material is then activated by a laser to produce at least one second color. The additive mixing of the first and second colors produces one or more halftone third colors that are different from the first or second colors. FIG. 8B shows the label 800 after the color changeable material has been activated. In some areas of the label 800, the activated color changeable material may form grey alphanumeric characters 820. In some areas, the second color of the activated color changeable material may additively mix with the first color of the non-color changeable material to produce halftone third colors 831, 832, 833. The non-color changeable material and the color changeable material may be patterned to produce multicolor images 840. The alphanumeric characters and/or other colored areas illustrated in the label of FIG. 8B are presented as an example. It will be appreciated that the colored areas could form other types of symbols or could have any suitable shape depending on the application.

Figure 9A:
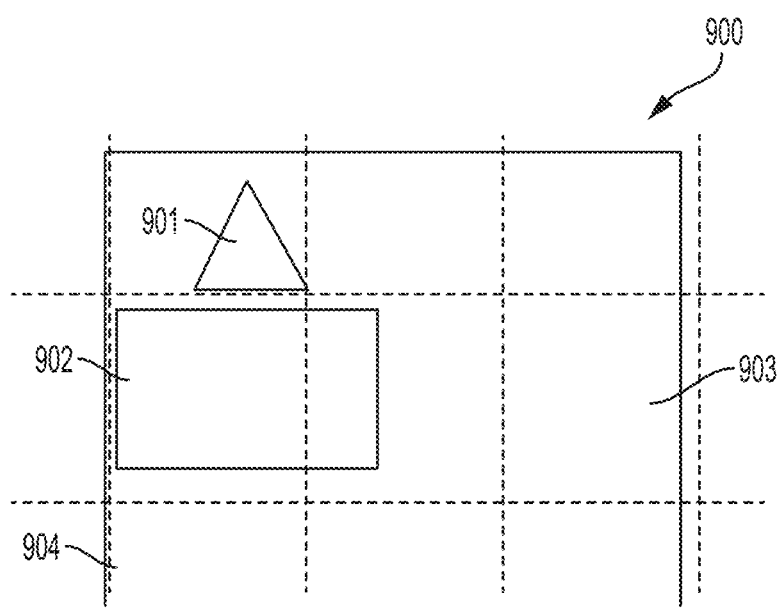
Figure 9B:
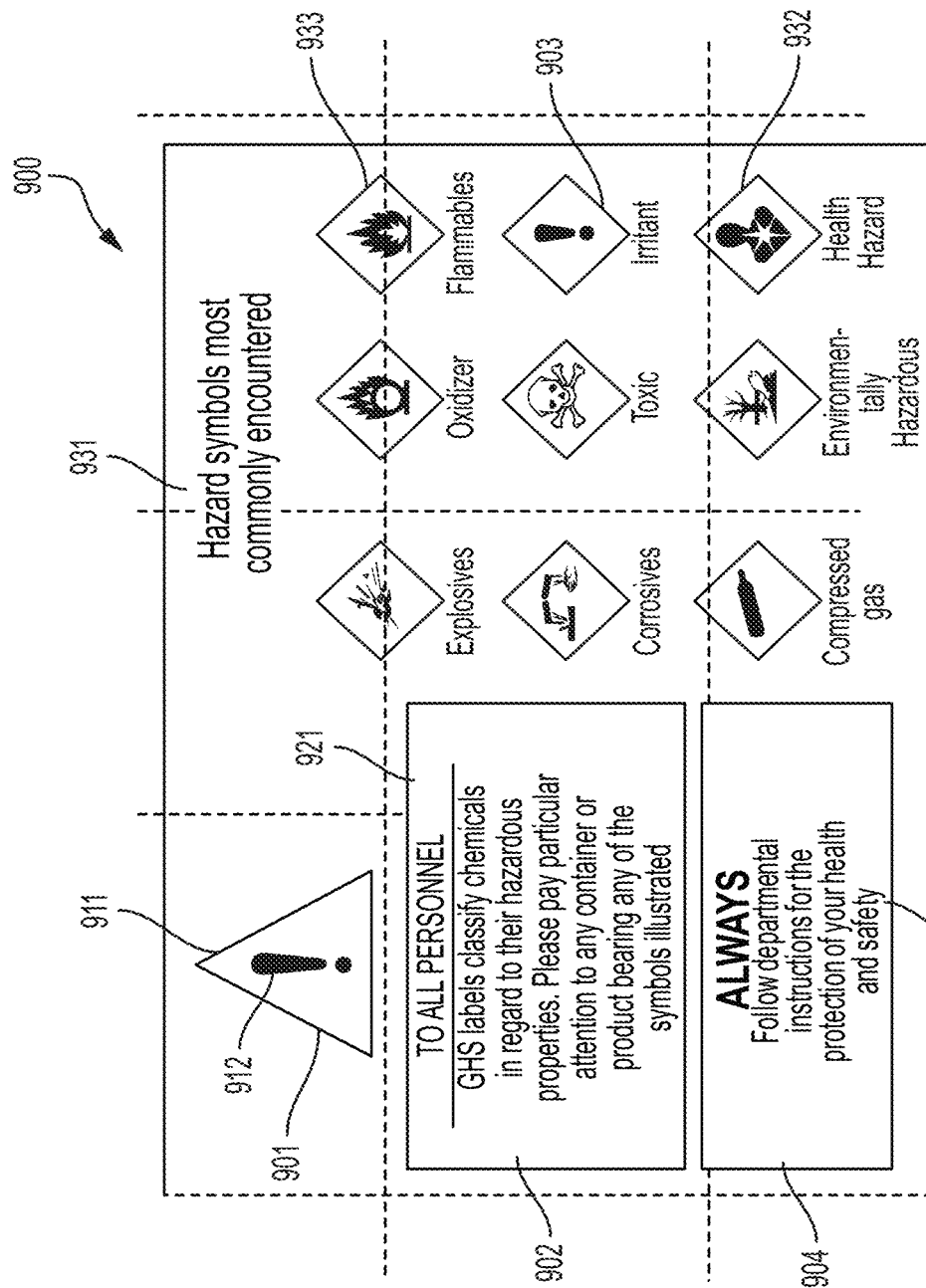

FIGS. 9A and 9B illustrate another example of a label 900 that uses color changeable and non-color changeable materials to provide an enhanced color gamut. A non-color changeable material of at least one color (e.g., yellow) is printed in a pattern on the label 900. Areas 901 and 902 are printed with the non-color changeable material and area 903 is devoid of the non-color changeable material. Before or after the non-color changeable material is printed, a color changeable thermochromic material is printed on the label 900. The color changeable thermochromic material is capable of being activated to produce two second colors, red and blue, along with white and shades of grey. The color changeable material may be disposed across the entire label or in selected areas of the label before or after the printing of the non-color changeable material. Subsequently, the thermochromic material is activated. In area 901, the color changeable material is activated to produce a grey exclamation point 911 and triangle 912. In area 902, the color changeable material is activated to produce grey alphanumeric characters 921. The non-color changeable material was not printed into areas 903 or 904. In area 904, the color changeable material is activated to produce a second color (e.g., blue) with white alphanumeric characters 941. In area 903, the color changeable material is activated to triangles 933 of another second color (e.g., red). The color changeable material is also activated to produce grey symbols 932 and characters 931 in area 903. In this example, there is no color mixing of the first and second colors. However, the label 900 has an expanded color gamut due to the use of the non-color changeable material in conjunction with the color changeable material when compared to the color gamut available in a label using the color changeable material alone.

Figure 10A:
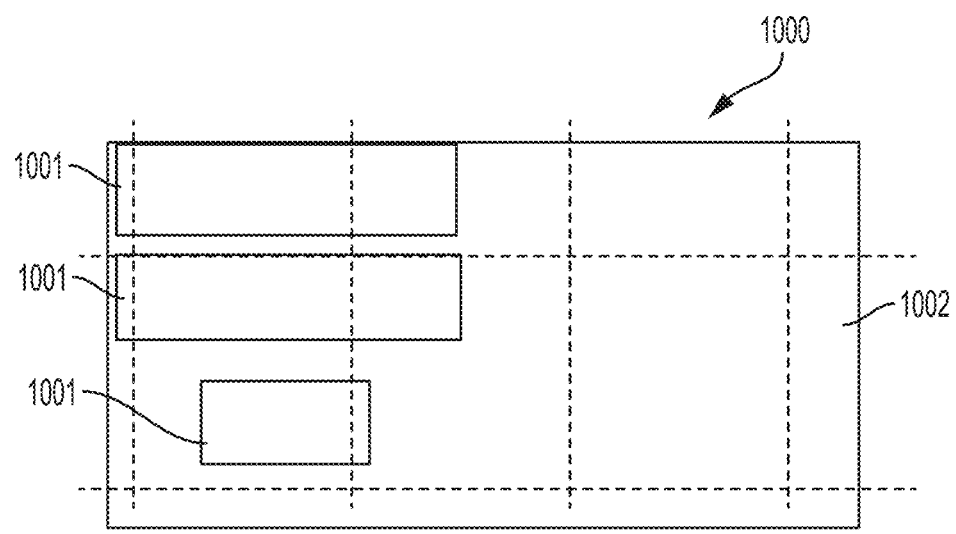
Figure 10B:
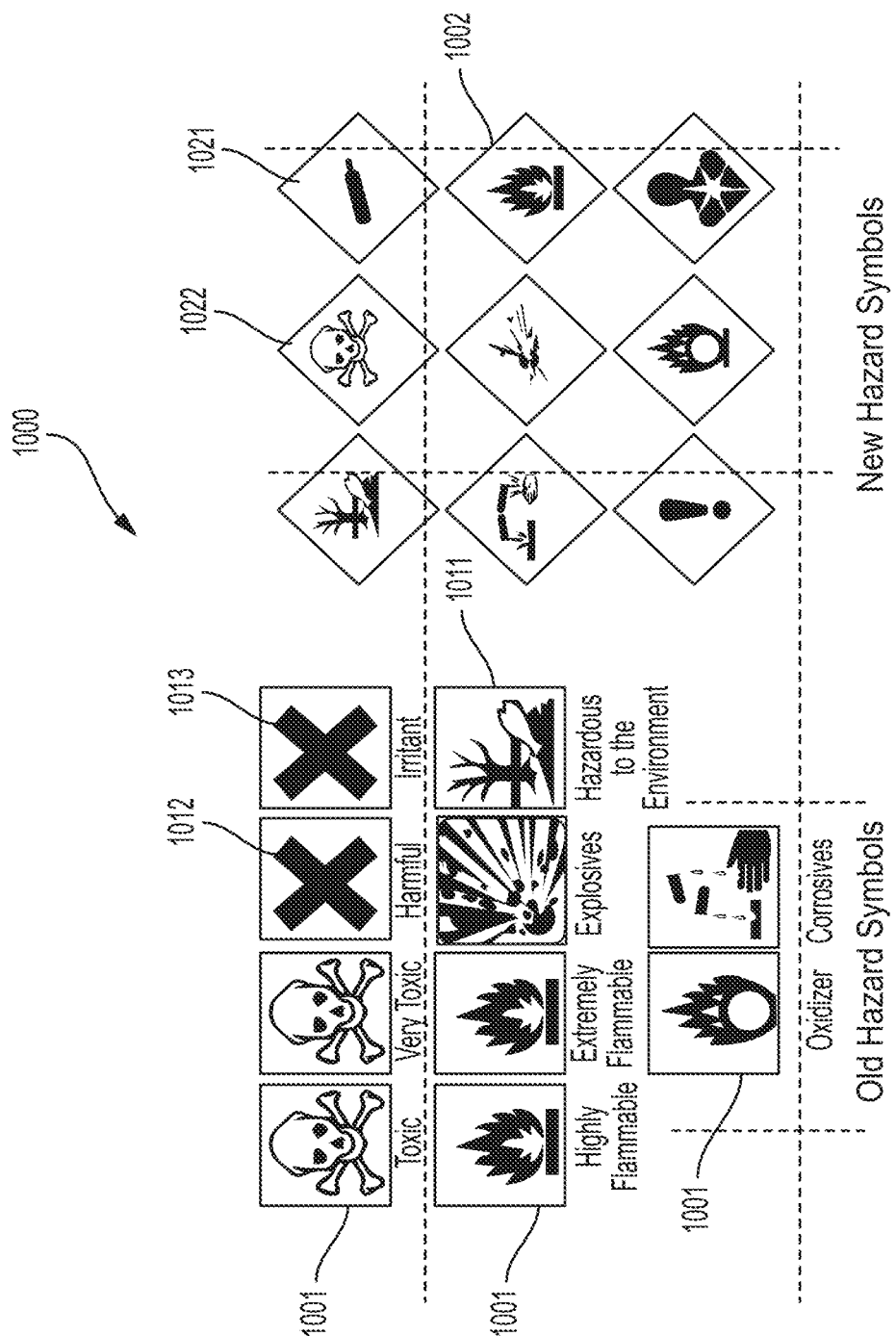

FIGS. 10A and 10B illustrate another example of a label 1000 that uses color changeable and non-color changeable materials to provide an enhanced color gamut. A non-color changeable material of at least one color (e.g., orange) is printed in a pattern on the label 1000. Areas 1001 are printed with the non-color changeable material and area 1002 is devoid of the non-color changeable material. Before or after the non-color changeable material is printed, a color changeable thermochromic material is printed on the label 1000. The color changeable thermochromic material is capable of being activated to produce one or more second colors, e.g., red, along with white and shades of grey. The color changeable material may be disposed across the entire label 1000 or in selected areas of the label before or after the printing of the non-color changeable material. Subsequently, the thermochromic material is activated. In area 1001, the color changeable material can activated to divide areas 1001 into boxes separated by white lines 1011 and borders 1012 and to produce a) symbols 1013 within the borders of the boxes. By mixing appropriate changeable colors red, blue, and the substrate a neutral color (grey) can be produced. For example, a grey at the point of y=0.33 and x=0.33 on FIG. 1 can be produced. The neutral color may be used to produce the symbols and borders in some embodiments. In area 1002, the color changeable material is activated to produce diamonds 1021 of the second color (red) and grey symbols 1022 within the red diamonds 1021 grey alphanumeric characters 921. In this example, there is no color mixing of the first and second colors. However, the label 1000 has an expanded color gamut due to the use of the non-color changeable material in conjunction with the color changeable material when compared to the color gamut available in a label using the color changeable material alone.

Figure 11:
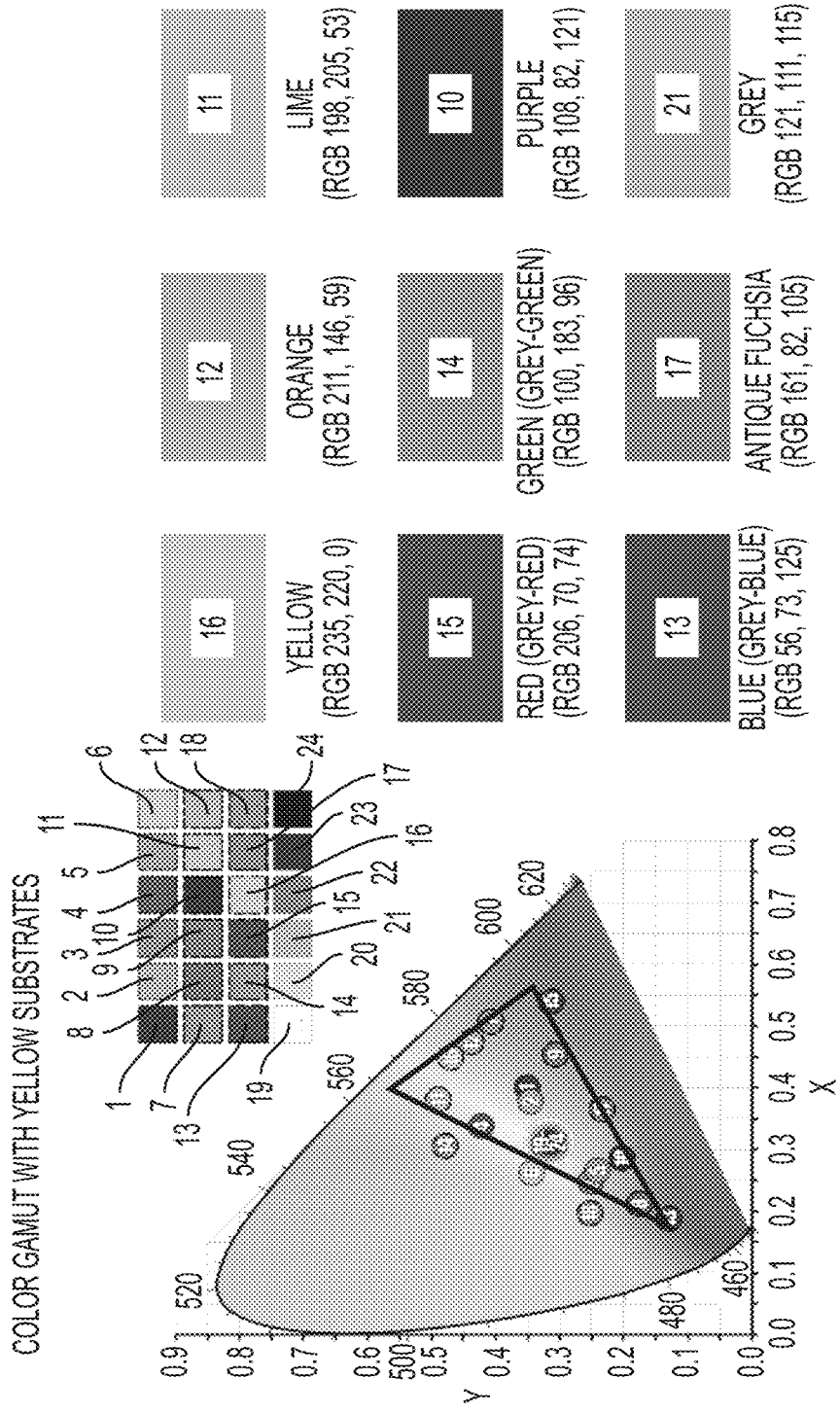
FIG. 11 is a CIE xy chart that shows measured halftone colors achieved using a two color thermochromic material capable of being activated to produce red or blue, on a yellow substrate in accordance with some embodiments.

Additive color mixing of one or more first colors of a non-color changeable material with one or more second colors of a color changeable thermochromic material can significantly enhance the color gamut of the color changeable material. FIG. 11 is a CIE xy chart that shows twenty-four measured halftone colors (denoted 1-24 in FIG. 11) achieved using a two color thermochromic material capable of being activated to produce red, blue, or mixtures of red and blue on a yellow substrate. For example, the yellow color of the substrate may fall within the box (255,255,0); (200,200,0); (200,200,55); (255,255,80) on the red, green, blue (RGB) color chart and the two color thermochromic material can be activated to produce a red or blue color, where the red color may fall within the box (255,0,0); (200,0,0); 186,55,55); (255,80,80) on the RGB color chart and the blue color may fall within the box (0,0,255); (0,0,200); (55,55,200); (80,80,255) on the RGB color chart.

Mixing the yellow color of the substrate and the red and/or blue of the thermochromic material can produce a third color, e.g., a yellow color falling within the box (255,255,0); (185,185,0); (185,185,40); (255,255,50) on the RGB color chart, a grey-red color falling within the box (255,136,136); (128,80,80); (135,100,100); (180,140,140) on the RGB color chart, a grey-blue color falling within the box (40,40,200); (35,35,130); (75,75,125); (128,128,214) on the RGB color chart, an orange color falling within the box (255,174,0); (173,118,0); (170,130,50); (255,200,80) on the RGB color chart, a grey-green color falling within the box (30,185,30); (20,95,20); (50,95,50); (110,185,110), on the RGB color chart, an antique fuchsia color falling within the box (185,0,110); (125,55,75); (125,75,90); (180,100,125) on the RGB color chart, a lime color falling within the box (0,255,0); (0,200,0); (70,200,70); (96,255,96) on the RGB color chart, a purple color falling within the box (255,0,255); (128,0,128); (128,30,128); (255,30,255) on the RGB color chart, and a grey point at (230,230,230) and at (125, 125, 125) on the RGB color chart.

Figure 12:
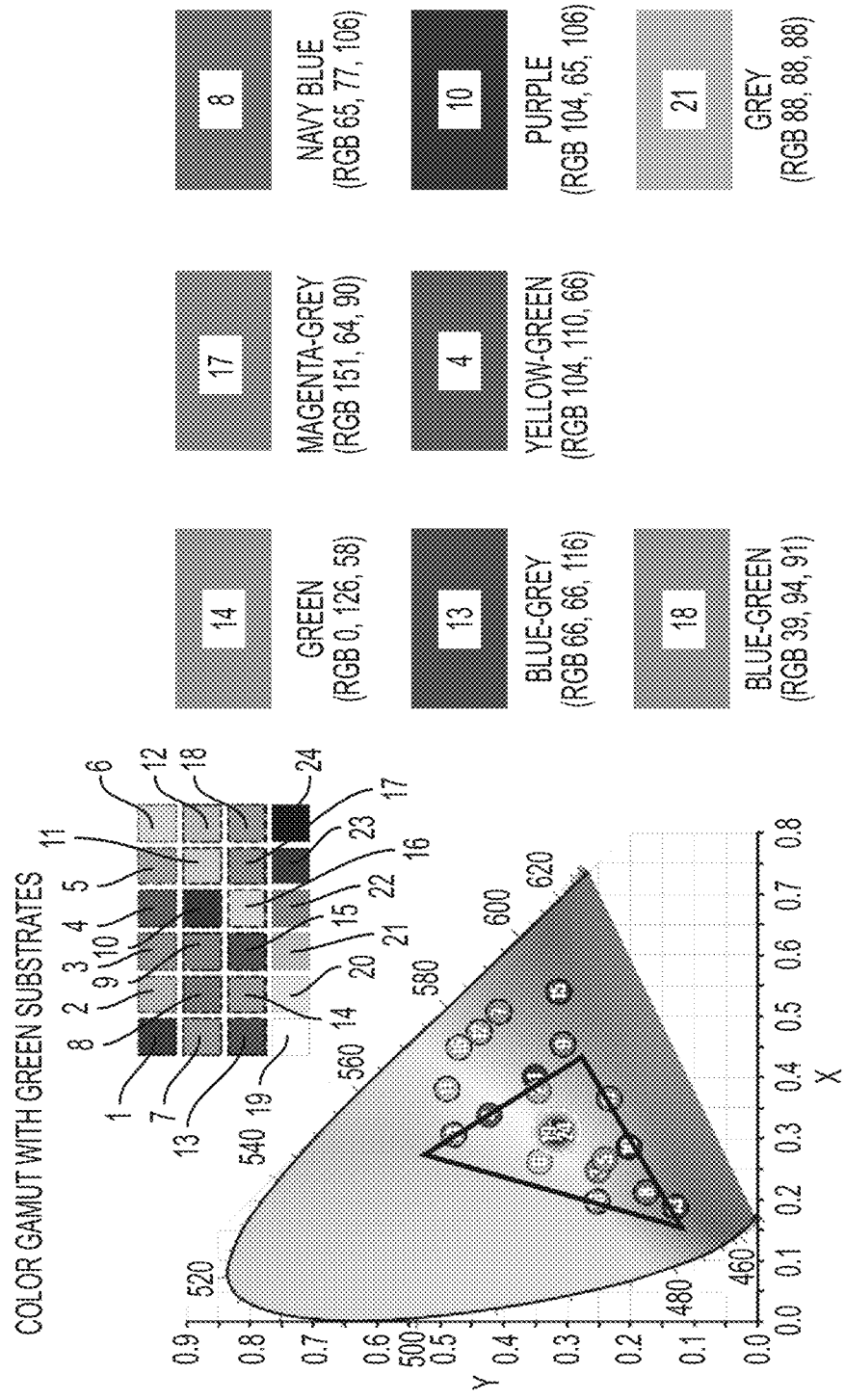
FIG. 12 is a CIE xy chart showing measured halftone colors achieved using a two color thermochromic material capable of being activated to produce red or blue, on a green substrate in accordance with some embodiments.

FIG. 12 is a CIE xy chart showing measured halftone colors achieved using a two color thermochromic material capable of being activated to produce red, blue, or mixtures of red and blue on a green substrate. FIG. 12 shows twenty-four measured halftone colors (denoted 1-24 in FIG. 12) achieved using a two color thermochromic material capable of being activated to produce red, blue, or mixtures of red and blue on a green substrate. For example, the green color of the substrate may fall within the box (0,255,0); (0,200,0); (70,200,70); (96,255,96) on the RGB color chart and the two color thermochromic material can be activated to produce a red or blue color, where the red color may fall within the box (255,0,0); (200,0,0); 186,55,55); (255,80,80) on the RGB color chart and the blue color may fall within the box (0,0,255); (0,0,200); (55,55,200); (80,80,255) on the RGB color chart.

Mixing the green color of the substrate and the red and/or blue of the thermochromic material can produce a third color, e.g., a green color falling within the box (0,255,0); (0,200,0); (70,200,70); (96,255,96) on the RGB color chart, a blue-grey color falling within the box (75,75,255); (50, 50,155); (90,90,155); (155,155,255) of the RGB color chart, a magenta-grey color falling within the box (255,50,255); (155,30,155); (155,90,155); (255,150,255) of the RGB color chart, a yellow-green color falling within the box (127,255, 0); (95,190,0); (95,160,30); (150,255,50) of the RGB color chart, a navy blue color falling within the box (0,0,255); (0,0,140); (25,25,140); (45,45,255) of the RGB color chart, a purple color falling within the box (255,0,255); (128,0, 128); (128,30,128); (255,30,255) of the RGB color chart, and a grey point at (230,230,230) and at (125,125,125); of the RGB color chart.

The process of forming the halftone colors shown in FIGS. 11 and 12 involves:
1. Measuring the RGB values of the red and blue thermochromic states on the substrate and the substrate with the unexposed thermochromic coating;
2. Determining the RGB values of the target color (the triplet of numbers below each color patch);
3. Using linear combinations of the red, blue and substrate RGB to compute the fractions of each needed to generate the RGB values of the target color; and
4. Printing a halftone dot whose fractions of colors are the result of step 3.

Alternatively, or in addition to expanding the color gamut of articles printed with a color changeable material, the use of suitable materials and/or coatings can expand the range of optical scattering properties and/or textures of the article. In one example, the substrate of the article may be selected to provide certain optical scattering properties to the article. For example, the substrate may have a metallic scattering profile, e.g., a large central scattering amplitude around a reflected spike. Added layers can then be used to modify the metallic scattering profile to include metallic colors such as metallic blue or metallic red.

With a metallic scattering or non-scattering substrate, one or more overcoat layers or intervening layers between the substrate, color changeable material layer and/or non-color changeable material layer can be used to achieve a scattering profile of a matte, semi-gloss, and glossy finish. For example, a light scattering layer may be added between any of the layers of articles 200, 300, 400, 500, 600, 700 shown in FIGS. 2-7 and/or a light scattering overcoat layer may be disposed over the top and/or bottom surfaces of the articles 200, 300, 400, 500, 600, 700.

Figure 13:
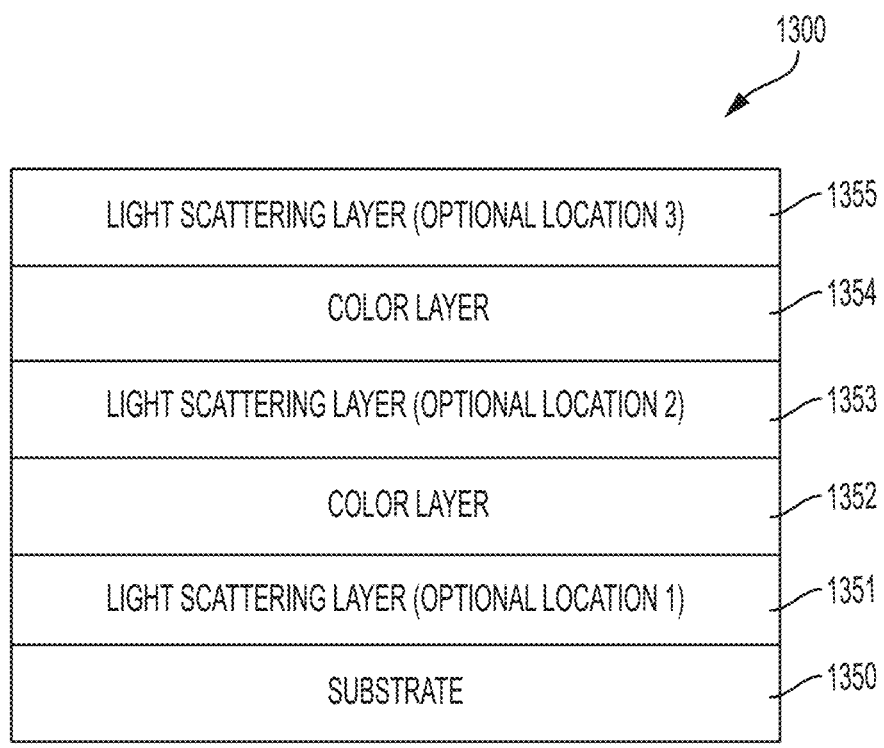
FIG. 13 is an article that provides for both enhanced color gamut and optical scattering properties in accordance with some embodiments.

FIG. 13 is an article 1300 that provides for both enhanced color gamut and optical scattering properties in accordance with some embodiments. The article includes a substrate 1350 and one or more color layers 1352, 1354 disposed over the substrate 1350. One of the color layers 1352, 1354 may be a non-color changeable layer and the other of the color layers 1352, 1354 may be a color changeable thermochromic layer as previously discussed. FIG. 13 shows three optional locations for light scattering layers. The article 1300 may include one or more of the light scattering layers 1351, 1353, 1355. The light scattering layer 1351 is disposed in optional location 1 between the substrate 1350 and color layer 1352; light scattering layer 1353 is disposed in optional location 2 in between the color layer 1352 and color layer 1354; and light scattering layer 1355 is disposed over color layer 1354. In some embodiments, the substrate 1350 may have a metallic scattering profile and one or more of the light scattering layers 1351, 1353, 1355 are used to modify the metallic scattering profile of the substrate 1350. Through the use of one or more light scattering layers 1351, 1353, 1355 and/or a substrate having the metallic scattering profile, a matte, semi-gloss, and high gloss scattering profiles can be obtained. In addition, in some implementations, the scattering properties of the substrate and/or the light scattering layer can be varies or patterned to yield a perceptually larger optical scattering gamut.

Figure 14:
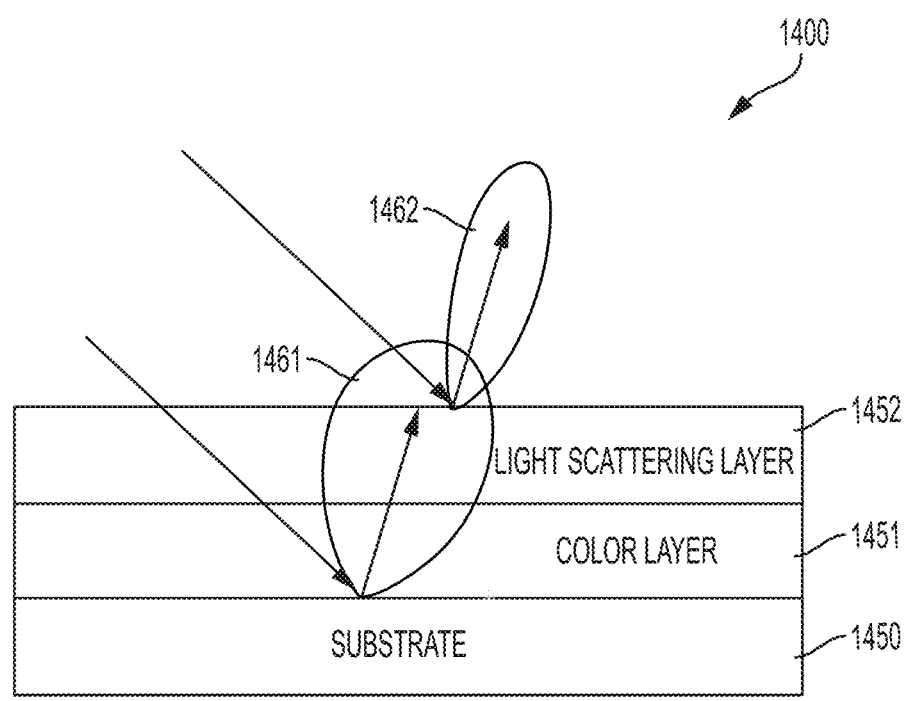
FIG. 14 illustrates an article comprising an overcoat layer that modifies the light scattering properties of the substrate in accordance with some embodiments.

FIG. 14 illustrates an article comprising an overcoat layer that modifies the light scattering properties of the substrate in accordance with some embodiments. FIG. 14 shows a portion 1400 of an article comprising a substrate 1450, color layer 1451, and overcoat layer 1452. The substrate 1450 has light scattering profile indicated by 1461. The light scattering profile of the 1461 of the substrate 1450 is modified by the overcoat layer 1452 to produce a modified light scattering profile 1462.

Various modifications and alterations of the embodiments discussed above will be apparent to those skilled in the art, and it should be understood that this disclosure is not limited to the illustrative embodiments set forth herein. The reader should assume that features of one disclosed embodiment can also be applied to all other disclosed embodiments unless otherwise indicated. It should also be understood that all U.S. patents, patent applications, patent application publications, and other patent and non-patent documents referred to herein are incorporated by reference, to the extent they do not contradict the foregoing disclosure.

The invention claimed is:

1. An article, comprising:
a substrate;
a first material disposed in or over the substrate; and
a second material disposed in or over the substrate, the first material being a non-color changeable material of at least one first color and the second material being a thermochromic color changeable material activated to produce at least one second color different from the first color, wherein additive color mixing of the first and second colors produces at least one third color different from the first and second colors.

2. The article of claim 1, wherein the color changeable material comprises constituents enabling it to be activated by exposure to laser light, directed hot air, or in-contact heating elements.

3. The article of claim 1, wherein the first material is disposed between the second material and the substrate.

4. The article of claim 1, wherein the second material is disposed between the first material and the substrate.

5. The article of claim 1, wherein at least one of the first material and the second material is embedded within the substrate.

6. The article of claim 1, wherein the first material and the second material are patterned side by side in or over the substrate.

7. The article of claim 1, wherein:
at least one of the first material and the second material is patterned into regions of the at least one material; and
the third color is a halftone color produced by additive color mixing of the first color and the second color.

8. The article of claim 1, wherein the at least one first color is a single color.

9. The article of claim 1, wherein the at least one first color comprises multiple colors arranged in a pattern in or on the substrate, the pattern comprising areas of different colors.

10. The article of claim 1, wherein the substrate comprises a metallic specular reflecting material.

11. The article of claim 1, wherein the substrate provides matter, glossy, or semi-glossy scattering properties.

12. The article of claim 1, further comprising a coating over the substrate, the coating providing matte, glossy, or semi-glossy light scattering properties.

13. The article of claim 1, further comprising an overcoat layer disposed over the second layer, the overcoat layer providing matte, glossy, or semi-glossy light scattering properties.

14. The article of claim 1, wherein the second material is a two color thermochromic material.

15. The article of claim 1, wherein:
the at least one first color is green;
the at least one second color is blue and red or a m; and
the at least one third color is one of green, blue-grey, magenta-grey, yellow-green, navy blue, purple, and grey.

16. The article of claim 1, wherein:
the at least one first color is yellow;
the at least one second color is blue and red; and
the at least one third color is one of yellow, grey-red, grey-blue, orange, grey-green, antique fuchsia, lime, purple, and grey.

17. A method comprising:
disposing a color changeable thermochromic material in or over a substrate, a non-color changeable material of at least one first color disposed in or over the substrate; and
activating the thermochromic material to produce at least one second color different from the first color such that at least one third color different from the first and second colors is produced by additive color mixing of the first and second colors.

18. The method of claim 17, further comprising disposing the non-color changeable material on the substrate.

19. The method of claim 18, wherein at least one of the color changeable material and the non-color changeable material is patterned such that the third color produced by color mixing of the first and second colors is a halftone color.

20. The method of claim 17, wherein the substrate comprises a metallic specular reflecting material.

21. The method of claim 17, wherein the substrate is configured to provide matte, glossy, or semi-glossy light scattering properties.

22. The method of claim 17, further comprising disposing a light scattering layer over the substrate, the light scattering layer providing matte, glossy, or semi-glossy light scattering properties.

* * * * *

UNITED STATES PATENT AND TRADEMARK OFFICE
CERTIFICATE OF CORRECTION

PATENT NO. : 10,649,243 B2
APPLICATION NO. : 16/049017
DATED : May 12, 2020
INVENTOR(S) : Warren B. Jackson, Christopher L. Chua and Ashish Pattekar Page 1 of 1

It is certified that error appears in the above-identified patent and that said Letters Patent is hereby corrected as shown below:

In the Claims

Column 10, Line 29 In Claim 15:
"the at least one second color is blue and red or a m; and" should read -- the at least one second color is one of blue and red or a mixture of blue and red; and --

Column 10, Line 35 In Claim 16:
"the at least one second color is blue and red; and" should read -- the at least one second color is one of blue and red; and --

Signed and Sealed this
Fourteenth Day of July, 2020

Andrei Iancu
*Director of the United States Patent and Trademark Office*